(12) United States Patent
Horiuchi et al.

(10) Patent No.: US 7,522,256 B2
(45) Date of Patent: Apr. 21, 2009

(54) LIQUID CRYSTAL LENS APPARATUS

(75) Inventors: Megumi Horiuchi, Fujiyoshida (JP); Toshiro Yukinari, Fujiyoshida (JP)

(73) Assignee: Citizen Electronics Co., Ltd., Yamanashi-ken (JP)

(*) Notice: Subject to any disclaimer, the term of this patent is extended or adjusted under 35 U.S.C. 154(b) by 228 days.

(21) Appl. No.: 11/495,268

(22) Filed: Jul. 28, 2006

(65) Prior Publication Data

US 2007/0024801 A1 Feb. 1, 2007

(30) Foreign Application Priority Data

| Jul. 28, 2005 | (JP) | ............................ 2005-219710 |
| Sep. 1, 2005 | (JP) | ............................ 2005-254214 |
| Oct. 11, 2005 | (JP) | ............................ 2005-295817 |

(51) Int. Cl.
G02F 1/13 (2006.01)
G02F 1/1333 (2006.01)

(52) U.S. Cl. ...................................... 349/200; 349/161

(58) Field of Classification Search .................. 349/20, 349/21, 22, 56, 57, 200, 193, 161; 359/666, 359/676
See application file for complete search history.

(56) References Cited

U.S. PATENT DOCUMENTS

| 4,729,641 | A | * | 3/1988 | Matsuoka et al. ........... 349/200 |
| 5,412,492 | A | * | 5/1995 | Zammit et al. ................. 349/1 |
| 5,592,314 | A | | 1/1997 | Ogasawara et al. |
| 5,683,838 | A | | 11/1997 | Iijima et al. |
| 6,191,881 | B1 | * | 2/2001 | Tajima ........................ 359/254 |
| 6,778,246 | B2 | * | 8/2004 | Sun et al. .................... 349/146 |
| 7,280,181 | B2 | * | 10/2007 | Finot ........................... 349/198 |
| 2005/0030438 | A1 | * | 2/2005 | Nishioka ...................... 349/21 |
| 2006/0215107 | A1 | | 9/2006 | Horiuchi et al. ............. 349/200 |
| 2007/0024801 | A1 | * | 2/2007 | Horiuchi et al. ............. 349/161 |

FOREIGN PATENT DOCUMENTS

| JP | 56-114908 A | 9/1980 |
| JP | 61-177433 A | 8/1986 |
| JP | 62-129815 A | 6/1987 |
| JP | S63-206721 | 8/1988 |
| JP | H05-053089 | 3/1993 |

(Continued)

OTHER PUBLICATIONS

United States Patent Trademark Office - Office Action dated Nov. 14, 2008. Ngo. Huyan Le, U.S. Appl. No. 11/385,494, filed Mar. 21, 2006.

(Continued)

*Primary Examiner*—Brian M Healy
(74) *Attorney, Agent, or Firm*—Brinks Hofer Gilson & Lione

(57) ABSTRACT

A liquid crystal lens apparatus includes a liquid crystal lens unit having first and second substrates including electrodes for applying a voltage a first liquid layer, an electric heating element including at least one high-electrical-resistance section for heating liquid crystal and at least one low-electrical-resistance section that are alternately connected to each other, and a thermo-transmission member spaced apart from the electric heating element for receiving heat from the electric heating element and transmitting the heat through the entire liquid crystal to facilitate heating of the liquid crystal layer by the electric heating element.

26 Claims, 13 Drawing Sheets

FOREIGN PATENT DOCUMENTS

| | | |
|---|---|---|
| JP | 05173153 A | 7/1993 |
| JP | H11-194358 | 7/1999 |
| JP | 2000199908 A | 7/2000 |
| JP | 2004-170852 | 6/2004 |

OTHER PUBLICATIONS

Chinese Office Action issued Feb. 6, 2009 in Chinese application No. 200610144764.3 (with translation), 22 pages.

* cited by examiner

LIQUID CRYSTAL LENS APPARATUS

This application claims priority under 35 U.S.C. §119 to Japanese Patent Application Nos. JP2005-219710 filed Jul. 28, 2005, JP2005-254214 filed Sep. 1, 2005 and JP2005-295817 filed Oct. 11, 2005, the entire content of which is hereby incorporated by reference.

BACKGROUND OF THE INVENTION

1. Field of the Invention

The present invention relates to a liquid crystal lens apparatus comprising a liquid crystal cell layer including transparent substrates and liquid crystal filled therebetween and electrodes on the liquid crystal cell layer, changing the refractive index of the liquid crystal by controlling a voltage applied between the electrodes, thereby adjusting the focal length.

2. Description of the Related Arts

Liquid crystal lenses used as varifocal lenses in focusing mechanisms in optical disk devices, cameras, and other known optical devices have been proposed.

One example is a liquid crystal lens including two transparent substrates facing each other in the form of a lens as a whole and liquid crystal sealed therebetween and being capable of adjusting the refractive index of the liquid crystal by changing a voltage applied to transparent electrodes disposed on the transparent substrates (see, for example, Japanese Unexamined Patent Application Publication No. S63-206721).

Another example is a flat liquid crystal lens including two flat transparent substrates, transparent electrodes disposed on the opposing inner surfaces of the transparent substrates, and liquid crystal sealed in a flat gap between the substrates, at least one of the transparent electrodes including a plurality of concentric electrodes elements disposed concentrically about the optical axis of the liquid crystal lens (see, for example, Japanese Unexamined Patent Application Publication No. H5-053089). In the flat liquid crystal lens, a voltage applied to each transparent electrode elements of the transparent electrodes is changed to generate a radially varying voltage distribution, and thereby change the refractive index of the liquid crystal.

Although it is not a technique regarding a liquid crystal lens, a technique for heating a liquid crystal panel used in a display by using an electric heating element on the liquid crystal panel to aim to avoid degradation of operating characteristics at low temperatures has been proposed (see, for example, Japanese Unexamined Patent Application Publication No. 2004-170852).

The inventors of the present invention have proposed a technique for forming an electric heating element on a glass substrate of a liquid crystal panel (see, for example, Japanese Unexamined Patent Application Publication No. H11-1194358).

In order to apply a liquid crystal lens to zooming function or focusing function of a camera, it is necessary to increase the variable range of a focal length. To this end, the refractive index is required to be much changeable.

For largely changing the refractive index of a flat liquid crystal lens, it is necessary to increase the refractive index anisotropy, Δn, of a liquid crystal material used in the liquid crystal lens or to increase the distance, d, between the substrates. However, there is a limit to the magnitude of the refractive index anisotropy. The refractive index anisotropy Δn is typically 0.4 or less. Therefore, it is necessary to increase the distance d between the substrates in order to obtain a desired change in the refractive index. In this case, the response speed of the liquid crystal lens to a driving voltage applied thereto decreases in proportion to the square of the distance d between the substrates.

For a liquid crystal lens used as a focusing mechanism of a camera, the response time is required to be no more than 2 seconds.

FIG. 24 is a graph showing the response time characteristics LC1 and LC2 of liquid crystal occurring when a driving voltage is applied across the liquid crystal in the case where the distance d between substrates sandwiching the liquid crystal is 10 μm and 25 μm. As is shown in FIG. 24, the response time characteristic LC1 for 10 μm of a distance d between the substrates is not longer than 2000 ms even at −10° C., whereas the response time characteristic LC2 for 25 μm of a distance d between the substrates is longer than 2000 ms even at 5° C.

Therefore, a liquid crystal cell having an increased distance d between the substrates for a liquid crystal lens is unable to function as a lens of a camera at low temperatures.

As mentioned the above, when a liquid crystal lens is functioned to control a focus of a camera, there arises a problem that an increased distance d between the substrates necessary for an increased focusing range makes the response time longer. An effective solution to this problem has not been found in existing liquid crystal lenses, in particular, those using low-voltage power supply such as battery power supply (e.g., electronic cameras). Therefore, a camera's focusing mechanism utilizing a liquid crystal lens is not yet in actual use.

The assignee of the present invention has proposed a liquid crystal lens using a heating system with an electric heating element and having an increased focusing range and an improved response speed in U.S. application Ser. No. 11/385,494. In the liquid crystal lens, liquid crystal is heated by heating elements, for example, in a shape of ring, disposed around electrodes on both side surfaces of a liquid crystal layer.

However, according to a further research conducted by the inventors of the present invention, in the case where a metal film having a diameter of approximately 5 mm, a width of approximately 200 μm, and a sheet resistance of 3Ω was used as an electric heating element, when a voltage of 3V, which was typically used in an electronic camera, was applied, a current of 60 mA was passed, consuming a power of 180 mW, and the temperature of the heating element rose only 20° C. This result shows that insufficient temperature compensation may occur in such a case. Therefore, in order to increase the overall liquid crystal lens temperature to a high temperature required for sufficient temperature compensation, it is necessary to transmit local high-temperature heat to the entire liquid crystal cell and to minimize idle heat dissipation to the outside.

SUMMARY OF THE INVENTION

Accordingly, it is an object of the present invention to provide a liquid crystal lens that is capable of generating heat for high temperatures required for temperature compensation by further improving a heater arrangement in the liquid crystal lens and obtaining sufficient temperature compensation even with a low-voltage power supply such as a battery power supply used in, for example, an electronic camera by preventing unevenness in the overall liquid crystal lens temperatures and that has a wide focusing range and enables high-speed response.

A liquid crystal lens apparatus according to a first aspect of the present invention includes a first liquid crystal lens unit, an electric heating element for heating liquid crystal, and a thermo-transmission member for transmitting heat from the electric heating element to the entire liquid crystal. The first liquid crystal lens unit includes a first substrate having a first transparent region, a second substrate having a second transparent region and being disposed parallel to the first substrate such that the second transparent region faces the first transparent region, a first liquid crystal layer made from liquid crystal filled between the first and second transparent regions, and first and second electrodes disposed on the first and second substrates, respectively, for applying a voltage across the first liquid crystal layer.

Specifically, the electric heating element may be disposed on the surface of the first substrate facing the first liquid crystal layer. The thermo-transmission member may be disposed on the surface of the second substrate facing the first liquid crystal layer and may be disposed on each of both side surfaces of the second substrate. As described above, since the electric heating element is in direct contact with the liquid crystal, heat can be efficiently transmitted to the liquid crystal while the liquid crystal is subjected to convection. As a result, even when the liquid crystal lens has a small heat capacity, heat can be satisfactorily transmitted to the liquid crystal. When the thermo-transmission members are disposed on both surfaces of the second substrate, the thermo-transmission members may be connected to each other via a hole passing through the second substrate.

The electric heating element may be disposed on a first surface of the first substrate, and the thermo-transmission member may be disposed on a second surface of the first substrate, the second surface being opposite the first surface, at a location corresponding to the electric heating element. The thermo-transmission member may be disposed on the second substrate at a location vertically corresponding to the electric heating element disposed on the first substrate. In this case, when the electric heating element is substantially in a shape of ring and disposed around the first electrode, the thermo-transmission member may be substantially in a shape of ring so as to correspond to the electric heating element. It is important to compensate for the temperature of the liquid crystal in order to maintain a high operation response speed, as the case of a liquid crystal display. Further, in a liquid crystal lens apparatus, the temperature compensation is important for stabilizing the refractive index and driving voltage threshold. In the present invention, the liquid crystal can be uniformly heated, functioning as a lens from the surroundings by forming the ring-shaped electric heating element around the electrode, as describe above, the response time can be maintained, and the refractive index and the driving voltage threshold can be stabilized.

The electric heating element and the thermo-transmission member may be made of the same metal film. In this case, the same metal film may be made of gold.

Furthermore, the electric heating element may be in a shape of strip and may include at least one high-electrical-resistance section and at least one low-electrical-resistance section that are alternately connected to each other. In this case, the high-electrical-resistance section may be made by causing the width of the high-electrical-resistance section to be smaller than the width of the low-electrical-resistance section by causing the thickness of the high-electrical-resistance section to be smaller than the thickness of the low-electrical-resistance section. The high-electrical-resistance section may be made of a transparent material. In this case, the transparent material may be indium tin oxide. Moreover, when the high-electrical-resistance section may be made of a transparent material, the line width of the high-electrical-resistance section may be larger than the line width of the low-electrical-resistance section.

The liquid crystal lens apparatus of the present invention may further includes a second liquid crystal lens unit including a third substrate having a third transparent region, a fourth substrate having a fourth transparent region and being disposed parallel to the third substrate such that the fourth transparent region faces the third transparent region, a second liquid crystal layer made from liquid crystal filled between the third and fourth transparent regions, and third and fourth electrodes disposed on the third and fourth substrates, respectively, for applying a voltage across the second liquid crystal layer. The first and second liquid crystal lens units may be disposed such that the orientation of the liquid crystal of the first liquid crystal layer and the orientation of the liquid crystal of the second liquid crystal layer are perpendicular to each other.

The liquid crystal lens apparatus may further comprise a second liquid crystal lens unit including a third substrate having a third transparent region and being disposed parallel to the first substrate such that the third transparent region faces the first transparent region, a second liquid crystal layer made from liquid crystal filled between the first and third transparent regions, and third and fourth electrodes disposed on the first and third substrates, respectively, for applying a voltage across the second liquid crystal layer. The first and second liquid crystal lens units may be disposed such that the orientation of the liquid crystal of the first liquid crystal layer and the orientation of the liquid crystal of the second liquid crystal layer are perpendicular to each other.

When the liquid crystal lens apparatus includes the second liquid crystal lens unit, the electric heating element may be placed in only the second liquid crystal lens unit.

A liquid crystal lens apparatus according to a second aspect of the present invention includes a first liquid crystal lens unit and an electric heating element being elongated and including at least one high-electrical-resistance section for heating liquid crystal and at least one low-electrical-resistance section that are alternately connected to each other, the high-electrical-resistance section and the low-electrical-resistance section being made of the same metal material. The first liquid crystal lens unit includes a first substrate having a first transparent region, a second substrate having a second transparent region and being disposed parallel to the first substrate such that the second transparent region faces the first transparent region, a first liquid crystal layer made from liquid crystal filled between the first and second transparent regions, and first and second electrodes disposed on the first and second substrates, respectively, for applying a voltage across the first liquid crystal layer.

In consideration of a device for use under low voltage (e.g., electronic cameras), in order to increase the heating efficiency at the high-electrical-resistance section, power consumption at the low-electrical-resistance section is preferably low. Therefore, the same metal material has preferably low electrical resistance (e.g., gold) for the low-electrical-resistance section, not a material having high electrical resistance (e.g., chromium oxide, indium oxide, or tin oxide film).

The electric heating element may be substantially ring shaped and disposed around the first electrode, and the high-electrical-resistance section may be made by providing the electric heating element with a notch in the width direction.

The liquid crystal lens apparatus may further include a second liquid crystal lens unit including a third substrate having a third transparent region, a fourth substrate having a fourth transparent region and being disposed parallel to the third substrate such that the fourth transparent region faces the third transparent region, a second liquid crystal layer made from liquid crystal filled between the third and fourth transparent regions, and third and fourth electrodes disposed on the third and fourth substrates, respectively, for applying a voltage across the second liquid crystal layer. The first and second liquid crystal lens units are disposed such that the orientation of the liquid crystal of the first liquid crystal layer and the orientation of the liquid crystal of the second liquid crystal layer are perpendicular to each other.

The electric heating element may be placed in only the second liquid crystal lens unit.

As described above, in the present invention heat generated from an electric heating element can be transmitted to the entire liquid crystal lens speedily, the heat can be trapped in the liquid crystal lens, and the heat can effectively be used by further improving a heater arrangement in the liquid crystal lens. Therefore, the present invention can provide a liquid crystal lens that is capable of sufficiently performing temperature compensation and that has a wide focusing range and enables high-speed response.

DESCRIPTION OF THE PREFERRED EMBODIMENTS

Embodiments of the present invention are described below with reference to the accompanying drawings.

Figure 1:
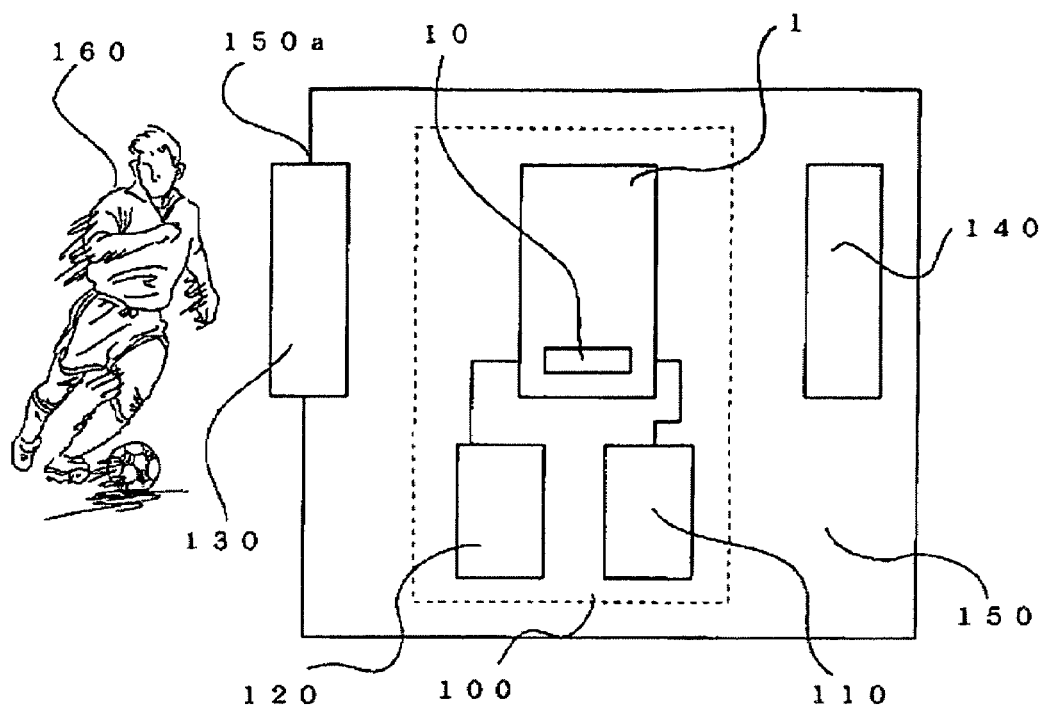
FIG. 1 is a block diagram of a camera mechanism that incorporates a liquid crystal lens apparatus according to the present invention.

FIG. 1 is a block diagram of a camera incorporating a liquid crystal lens apparatus 100 according to the present invention.

As illustrated in FIG. 1, the liquid crystal lens apparatus 100 includes a liquid crystal lens 1 having an electric heating element 10, a liquid-crystal driving circuit 110, and a heater-driving power supply 120 for driving the electric heating element 10. The liquid crystal lens apparatus 100 is accommodated in a housing 150, together with optical lenses 130 and 140. The liquid crystal lens apparatus 100, the optical lens 130, and the optical lens 140 are aligned along an optical axis. FIG. 1 illustrates a state where the camera is pointed at an object 160.

Figure 2:
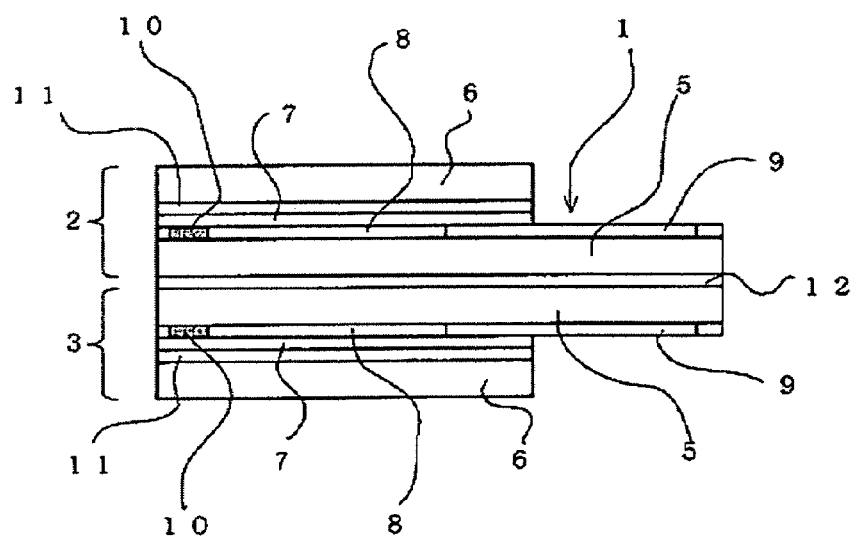
FIG. 2 is a sectional view of a liquid crystal lens according to a first embodiment of the present invention.
Figure 3:
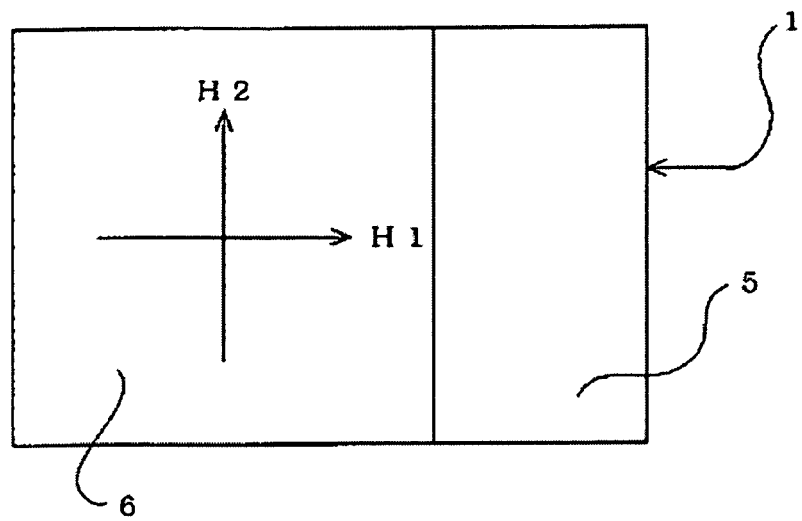
FIG. 3 is a plan view of the liquid crystal lens according to the first embodiment.

FIG. 2 is a sectional view of the liquid crystal lens 1 shown in FIG. 1. FIG. 3 is a plan view of the liquid crystal lens 1.

As illustrated in the figures, the liquid crystal lens 1 has a first liquid crystal lens unit 2 and a second liquid crystal lens unit 3. The first liquid crystal lens unit 2 and the second liquid crystal lens unit 3 are bonded together with a UV boding layer 12. The first liquid crystal lens unit 2 and the second liquid crystal lens unit 3 have substantially the same fundamental structure and each have a first transparent substrate 5, a second transparent substrate 6, and a liquid crystal layer 7 made between the first and second transparent substrates 5 and 6. The first transparent substrate 5 and the second transparent substrate 6 face each other.

As illustrated in FIGS. 2 and 3, the liquid crystal layers 7 of the first liquid crystal lens unit 2 and the second liquid crystal lens unit 3 have uniform orientations H1 and H2, respectively, and the orientations are made orthogonal to each other for the following reason. As disclosed in Japanese Unexamined Patent Application Publication No. 5-053089 mentioned above, when a single liquid crystal layer with the uniform orientation is used, the change in the refractive index of the liquid crystal can be maximum, but the degree of polarization of light passing through the liquid crystal is increased. The liquid crystal layers 7 with their respective orientations made described the above, can cancel out the polarization of light passing through the liquid crystal layers 7 and thus can facilitate appropriate focusing operation over a wide range.

Figure 4:
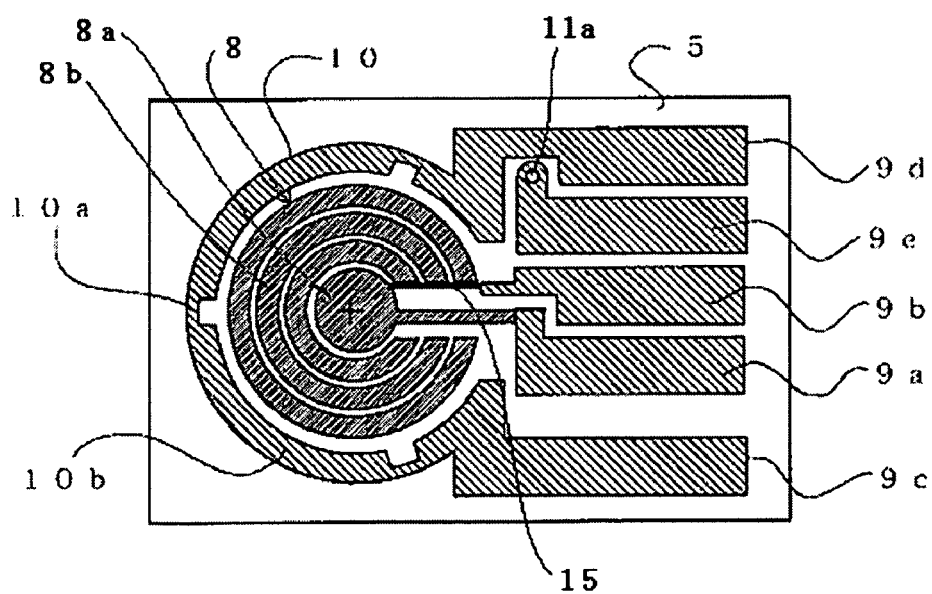
FIG. 4 illustrates a pattern on a first substrate shown in FIG. 2.

As illustrated in FIG. 4, a concentric transparent liquid-crystal driving electrode set 8 and the electric heating element 10 around the concentric electrode set 8 are disposed on an outer surface facing the liquid crystal layer 7 of the first transparent substrate 5. The concentric electrode set 8 includes a center electrode 8a and a plurality of annular electrodes 8b disposed concentrically around the center electrode 8a. The center electrode 8a and the annular electrodes 8b are connected together with a resistance wire 15. The outer end of the center electrode 8a is connected to a connection terminal 9a, and the outer end of the resistance wire 15 is connected to a connection terminal 9b. The first transparent substrate 5 is further provided with a connection terminal 9e connected to a common liquid-crystal driving electrode 11, illustrated in FIG. 5, disposed on the second transparent substrate 6 through an inter-substrate conductive via 11a. Both the concentric liquid-crystal driving electrode set 8 and the common electrode 11 are transparent electrodes that can be made from indium tin oxide (ITO).

When a liquid crystal driving voltage signal is applied from the liquid-crystal driving circuit 110 to the liquid crystal lens 1 through the connection terminals 9a and 9b, different electric potentials are generated to the center electrode 8a and the annular electrodes 8b. As a result, a radially varying voltage is applied to the liquid crystal layer 7 disposed between the concentric liquid-crystal driving electrode set 8 and the common electrode 11, and thus the refractive index of the liquid crystal layer 7 is controlled, thus allowing lens function to be performed. The heater-driving power supply 120 heats the liquid crystal layer 7 with the electric heating element 10 when the temperature of the liquid crystal layer 7 is lower than a predetermined value, thereby maintaining a desired response speed of the liquid crystal layer 7.

Figure 6A:
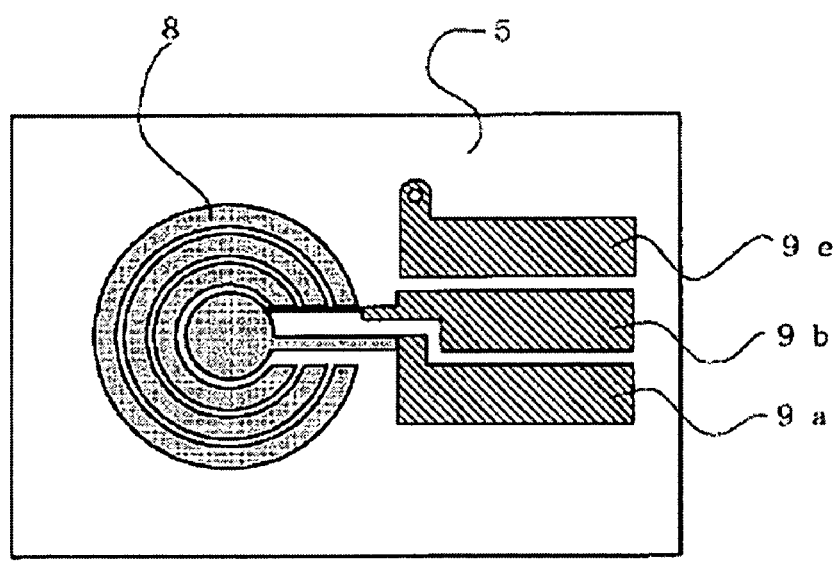
FIG. 6A illustrates a pattern of the liquid crystal lens on the first substrate shown in FIG. 2
Figure 6B:
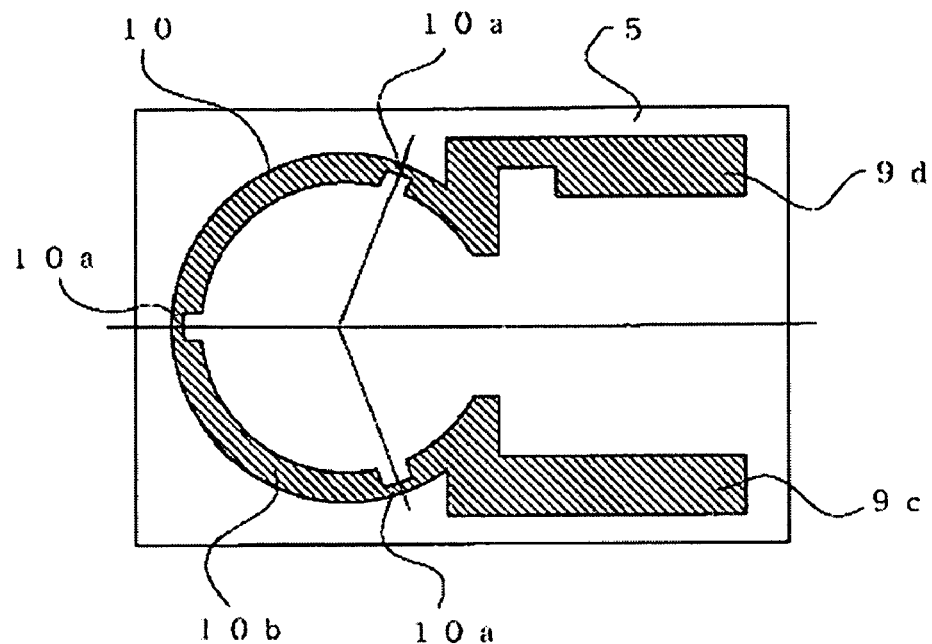
FIG. 6B illustrates a pattern of an electric heating element on the first substrate shown in FIG. 2.

FIGS. 6A and 6B separately illustrate the pattern shown in FIG. 4. FIG. 6A illustrates the concentric liquid-crystal driving electrode set 8, and FIG. 6B illustrates the electric heating element 10.

Referring to FIG. 6B, the electric heating element 10 is disposed so as to surround the concentric liquid-crystal driving electrode set 8. The liquid crystal lens 1 is temperature-compensated by causing high-resistance sections 10a of the heating element 10 to generate heat upon the application of a voltage from the heater-driving power supply 120 to two connection terminals 9c and 9d connected to the electric heating element 10. The diameter of the liquid crystal lens 1 is as small as 4 mm, and the diameter of the electric heating element 10, which surrounds the lens area, is also as small as 5 mm or less. The electric heating element 10 is made of a uniform metal film such as a gold thin film, but does not have a uniform width. The electric heating element 10 includes low-resistance sections 10b having a larger width and the high-resistance sections 10a having a smaller width and serving as a heat-generating part. The electric heating element 10 may not be transparent because the electric heating element 10 is disposed outside the lens area. The electric heating element 10 may be made of a metal material having good electrical conductivity other than gold.

In this embodiment, the electric heating element 10 is made of the same gold thin film as in the connection electrode set 9. The low-resistance section 10b has a length of substantially 200 μm. Each of the high-resistance sections 10a has a length of substantially 20 μm and a width L of substantially 20 μm.

The three high-resistance sections 10a are disposed symmetrically about the center of the ring shape of the electric heating element 10.

As a result, the resistance between the connection electrodes 9d and 9c was 58Ω. When a voltage of 3V was supplied to the connection terminals 9d and 9c, a current of 51.7 mA was passed and a temperature rise in the three high-resistance sections exceeded 100° C. Therefore, sufficient temperature compensation was performed.

The shape and the position of the high-resistance sections 10a can be flexibly set according to necessitated heat-generating conditions. In addition, since the heat-element 10 is formed from separated segments, i.e., the three high-resistance sections 10a in this embodiment, thermal diffusion is improved. Furthermore, since heat is generated by using only the small high-resistance sections 10a, not by using the overall electric heating element 10, the temperature rise can be increased. Moreover, since the high-resistance sections 10a are arranged symmetrically about the center of the ring shape of the electric heating element 10, the heat generated by the high-resistance sections 10a can be efficiently transmitted to the entire liquid crystal layer.

In view of effectiveness in the local heat generation and the thermal transmission to the liquid crystal lens, it is preferable that three to ten high-resistance sections 10a be arranged symmetrically about the center of the ring shape of the electric heating element 10.

Figure 7:
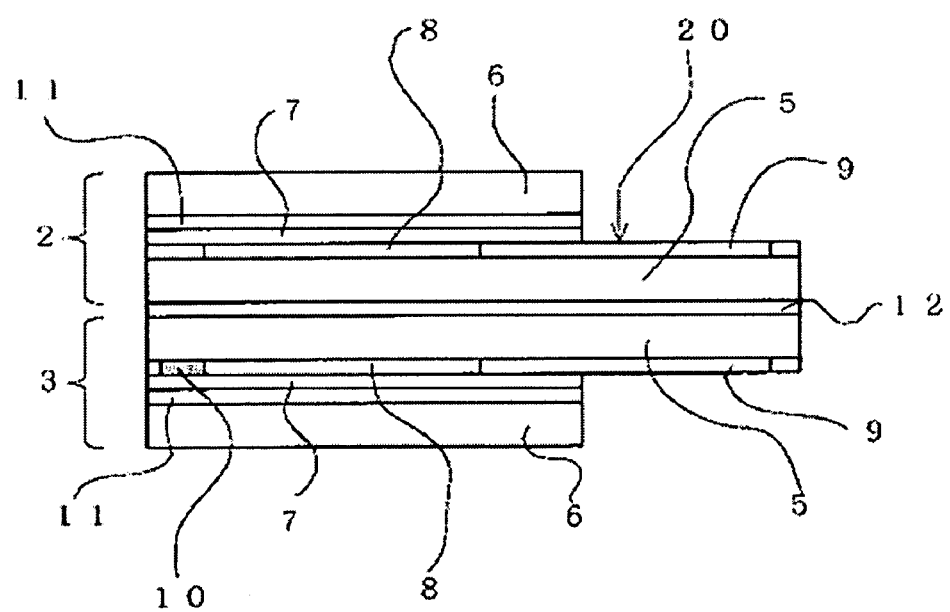
FIG. 7 is a sectional view of a liquid crystal lens according to a first modification of the first embodiment.

FIG. 7 is a sectional view of a liquid crystal lens 20 according to a first modification of the first embodiment. The liquid crystal lens 20 differs from the liquid crystal lens 1 illustrated in FIG. 2 in that the electric heating element 10 is provided only in the second liquid crystal lens unit 3 and no electric heating element is provided in the first liquid crystal lens unit 2. The inventors of the present invention conducted an experiment to look into temperature characteristics of the liquid crystal layer 7 in the liquid crystal lens comprising two liquid crystal lens units. The experiment result shows that the liquid crystal lens in which the electric heating element 10 is provided only in the second liquid crystal lens unit 3, as illustrated in FIG. 7, is superior to the liquid crystal lens in which the electric heating element 10 is provided only in the first liquid crystal lens unit 2 and is not so inferior to the liquid crystal lens in which the electric heating element 10 is provided in each of the upper cell and lower cell, as illustrated in FIG. 2.

Figure 9:
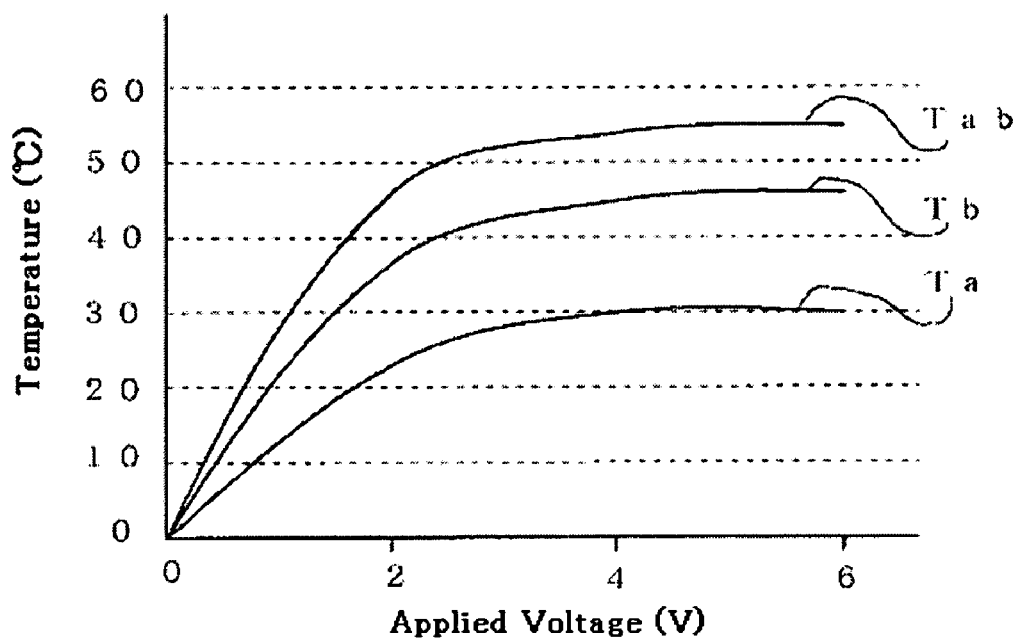
FIG. 9 illustrates temperature characteristics of the liquid crystal lens heated with different electric heating element arrangements.

Temperature characteristics of those liquid crystal lenses are shown in a graph of FIG. 9. The horizontal axis of the graph represents the voltage applied to the electric heating element 10, and the vertical axis represents the temperature of the liquid crystal layers. In FIG. 9, Tab denotes a temperature characteristic of temperature rise in the liquid crystal lens having the electric heating elements 10 provided on both the first liquid crystal lens unit 2 and the second liquid crystal lens unit 3, Ta denotes a temperature characteristic of temperature rise in the liquid crystal lens having the electric heating element 10 provided only on the first liquid crystal lens unit 2, and Tb denotes a temperature characteristic of temperature rise in the liquid crystal lens having the electric heating element 10 provided only on the second liquid crystal lens unit 3.

Since the first liquid crystal lens unit 2 was connected to the second liquid crystal lens unit 3 with the UV boding layer 12 which has good thermal conductivity, the first liquid crystal lens unit 2 and the second liquid crystal lens unit 3 were at substantially the same temperature in any of the liquid crystal lenses. The temperatures of the two kinds of the liquid crystal lenses with the single electric heating element 10 are, of course, lower than that of the liquid crystal lens with the double electric heating elements 10 and are different from each other.

The reason why the temperatures were different in the two kinds of the liquid crystal lenses with the single electric heating element 10 is that the heat generated by the heating element 10 therein dissipates to the outside through an opening 150a of the housing 150, as illustrated in FIG. 1.

When the liquid crystal lens has the electric heating element 10 provided only in the first liquid crystal lens unit 2, some amount of the generated heat dissipates directly to the outside through the opening 150a of the housing 150. Therefore, the heat is not used to heat the second liquid crystal lens unit 3 and, as a result, the temperature of the liquid crystal lens is relatively low. In contrast, when the liquid crystal lens has the electric heating element 10 provided only in the second liquid crystal lens unit 3, the electric heating element 10 heats the second liquid crystal lens unit 3 and passes its heat to the first liquid crystal lens unit 2, although some amount of the generated heat dissipates to the outside from the opening 150a of the housing 150. Therefore, the generated heat is be effectively utilized, so that the temperature of the liquid crystal lens is relatively high.

As will be noted from the above, the liquid crystal lens as shown in FIG. 7 is advantageous in that it can effectively use the heat generated by the electric heating element 10 and, therefore, the temperature of the liquid crystal lens is not significantly different from that of the liquid crystal lens as shown in FIG. 2 in which the electric heating elements 10 are provided in both liquid crystal lens units. Further, the liquid crystal lens as shown in FIG. 7 is advantageous in that it is simple in construction and cost effective as compared with the liquid crystal lens shown in FIG. 2.

Figure 8:
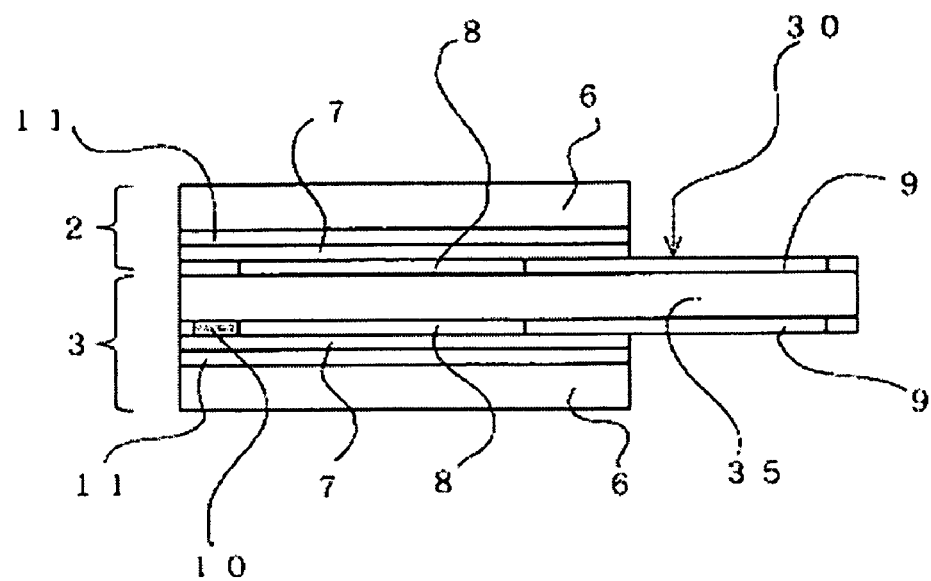
FIG. 8 is a sectional view of a liquid crystal lens according to a second modification of the first embodiment.

FIG. 8 is a sectional view of a liquid crystal lens 30 according to a second modification of the first embodiment.

The liquid crystal lens 30 illustrated in FIG. 8 differs from the liquid crystal lens 1 illustrated in FIG. 7 in that a third substrate 35 which is a single common substrate is provided, in place of the two first transparent substrates 5 of the first liquid crystal lens unit 2 and the second liquid crystal lens unit 3.

In the liquid crystal lens of FIG. 8, the concentric liquid-crystal driving electrode set 8 illustrated in FIG. 4 is disposed on the opposite side surfaces of the third substrate 35, and the electric heating element 10 is provided only on the surface of the third substrate 35 present in the second liquid crystal lens unit 3.

The liquid crystal lens 30 can have the heating characteristics as stated with regard to the liquid crystal lens 20 of FIG. 7. Moreover, since the liquid crystal lens 30 requires no UV boding layer 12 which can be an obstacle to the thermal conductivity between the first and second liquid crystal lenses, the heating characteristics thereof can be better than those of the liquid crystal lens 20. The electric heating element 10 may also be provided in the first liquid crystal lens unit 2.

Figure 10:
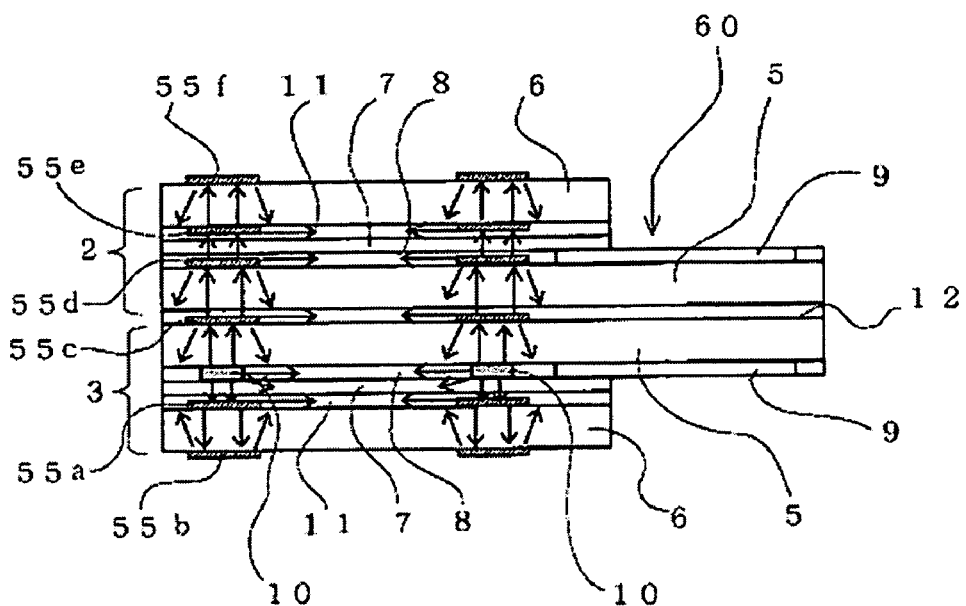
FIG. 10 is a sectional view of a liquid crystal lens according to a second embodiment of the present invention.

FIGS. 10 to 13 illustrate a liquid crystal lens 60 according to a second embodiment. FIG. 10 is a sectional view of the liquid crystal lens 60. The liquid crystal lens 60 has substantially the same fundamental structure as the liquid crystal lens 20 which is the first modification of the first embodiment illustrated in FIG. 7. The difference between the liquid crystal lens 60 and the liquid crystal lens 20 is a thermo-transmission member set 55 in the liquid crystal lens 60.

Figure 11:
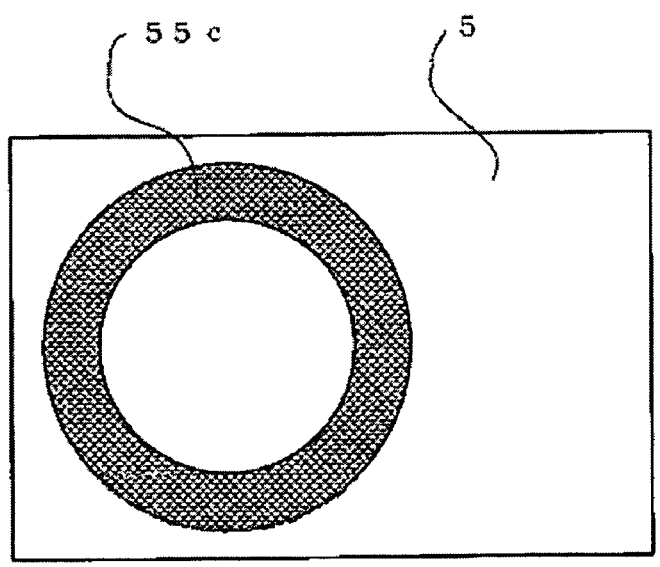
FIG. 11 illustrates a pattern on an outer surface of the first substrate shown in FIG. 10.

The lower surface of the first transparent substrate 5 of the second liquid crystal lens unit 3 in the liquid crystal lens 60 is provided with the same pattern of the concentric electrodes and the heating element as that shown in FIG. 4, the lower surface facing the liquid crystal layer 7. The opposite side or upper surface of the same is provided with a ring-shaped pattern of a thermo-transmission member 55c as shown in FIG. 11. The ring-shaped thermo-transmission member 55c has substantially the same ring shape as the ring-shaped electric heating element 10 and has a width slightly larger than that of the electric heating element 10. The thermo-transmission member 55c and the electric heating element 10 are axially aligned with one another so that the heat generated by the electric heating element 10 is reflected, stored, and radiated by the thermo-transmission member 55c so as to effectively be transmitted to the liquid crystal layer.

Figure 12A:
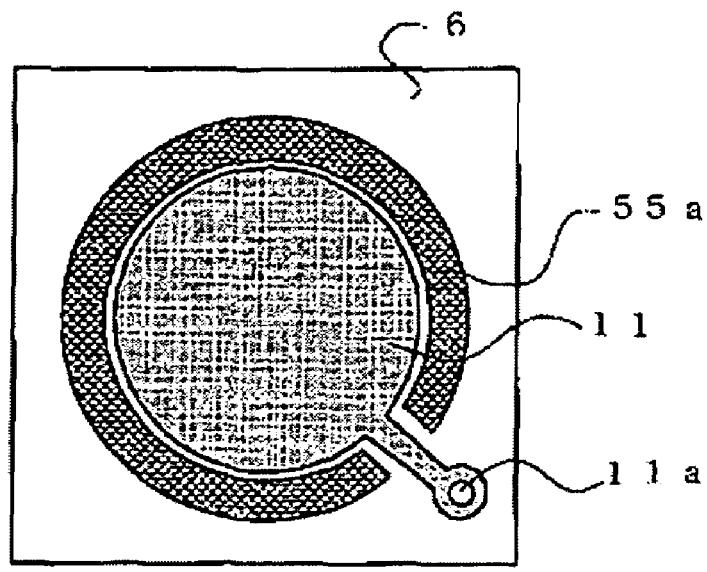
FIG. 12A illustrates a pattern on an inner surface of the second substrate shown in FIG. 10
Figure 12B:
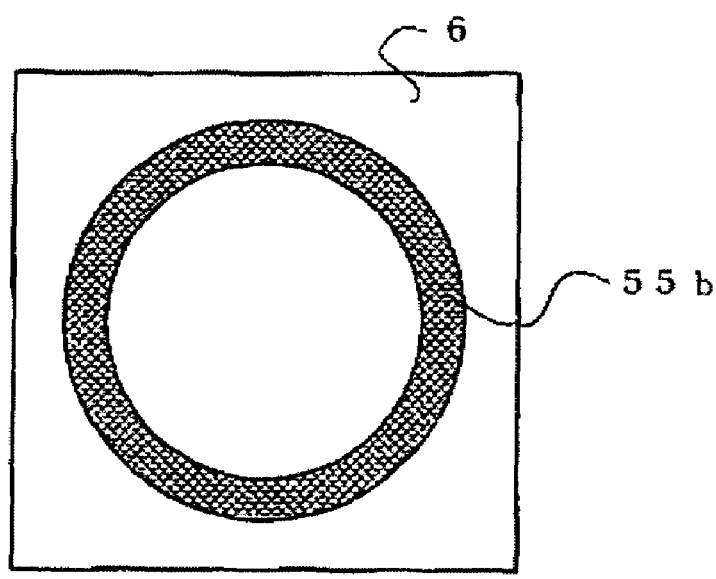
FIG. 12B illustrates a pattern on an outer surface of the second substrate shown in FIG. 10.

FIG. 12A shows the inner or upper surface of the second transparent substrate 6, and FIG. 12B shows the outer or lower surface of the same.

Figure 5:
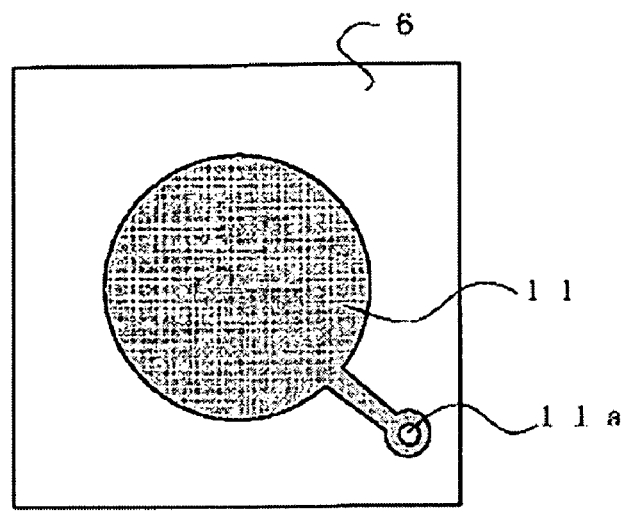
FIG. 5 illustrates a pattern on a second substrate shown in FIG. 2.

FIG. 12A corresponds to FIG. 5 in the first embodiment. As shown, the upper surface of the second transparent substrate 6 is provided with a common electrode 11 and a thermo-transmission member 55a surrounding the common electrode 11. As shown in FIG. 12B, on the lower surface of the second transparent substrate 6, there is provided a thermo-transmission member 55b. Like the thermo-transmission member 55c in FIG. 13, each of the thermo-transmission members 55a and 55b has a ring shape whose width is slightly larger than that of the electric heating element 10, and the thermo-transmission members 55a and 55b and the electric heating element 10 are disposed so as to overlap one another in cross section.

Figure 13:
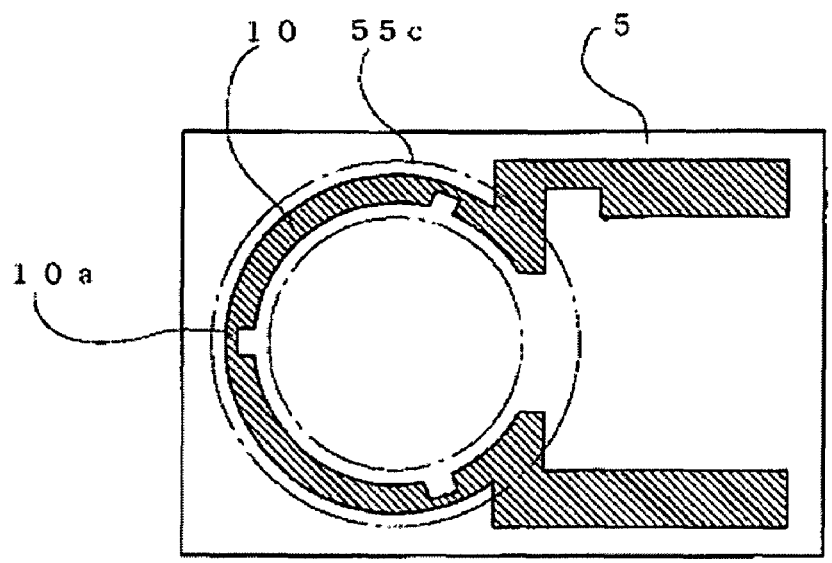
FIG. 13 illustrates patterns for showing the positional relationship between the electric heating element on the inner surface of the first substrate shown in FIG. 10 and a thermo-transmission member on the outer surface of the first substrate.

FIG. 13 illustrates patterns for showing the positional relationship between the electric heating element 10 on the inner surface of the first substrate 5 and the thermo-transmission member 55c on the outer surface of the first substrate 5, as seen from the liquid crystal layer 7 in the first transparent substrate 5. The electric heating element 10 is indicated by the solid lines, and the thermo-transmission member 55c is indicated by the alternate long and short dashed lines.

The thermo-transmission member 55c has a ring shape whose width is slightly larger than that of the ring-shaped electric heating element 10 and is axially aligned with the electric heating element 10.

Although not shown, thermo-transmission members 55d, 55e, and 55f of the first liquid crystal lens unit 2 are in the same shape as the thermo-transmission members 55a, 55b and 55c.

Heating of the liquid crystal lens is performed by the electric heating element 10 and the thermo-transmission member set 55 as described below with reference to FIG. 10 wherein arrows donate directions of transmission of heat in the liquid crystal lens.

When the high-resistance sections 10a of the electric heating element 10 generate heat by being driven by the heater-driving power supply 120, some part of radiant heat is directly transmitted to and heats the liquid crystal layer 7, but a major part of the heat impinges on the thermo-transmission member 55a disposed opposite the electric heating element 10. A part of the heat that was impinged on the thermo-transmission member 55a is reflected and heats the surroundings, and a major part of the heat is stored in the thermo-transmission member set 55c.

Similarly, a part of the heat from the thermo-transmission member set 55, which has become another heating source by storing the impinged heat directly heats the liquid crystal layers 7, but a major part of the heat impinges on the opposite thermo-transmission member 55c. A part of the impinged heat that was impinged on the thermo-transmission member is reflected and heats the surroundings, and a major part of the same is stored in the thermo-transmission member set 55c.

Further, the heat generated by high-resistance sections 10a of the heating element 10 is transmitted to the thermo-transmission members in the first liquid crystal lens unit 2 in a similar way.

By repeating the process described above, heat generated by the high-resistance sections 10a is effectively transmitted through the liquid crystal lens 60 to increase the temperature of the same uniformly. The thermo-transmission members 55b and 55f, which are disposed on the outer surfaces of the first liquid crystal lens unit 2 and the second liquid crystal lens unit 3, reflect and store the heat impinging thereon so that an effective part of the generated heat is trapped in the liquid crystal lens 60.

Required numbers of electric heating elements and thermo-transmission members can be provided in required locations, depending on the shape of the liquid crystal lens and various conditions.

In the embodiment illustrated in FIG. 10, the liquid crystal lens 60 includes the single electric heating element 10 and the six thermo-transmission members 55a-55f. Alternatively, each of the first liquid crystal lens unit 2 and the second liquid crystal lens unit 3 can be provided with an electric heating element 10, and a plurality of thermo-transmission members can be properly positioned.

In particular, as for required locations for the thermo-transmission member set 55, the thermo-transmission members 55a, 55d, and 55e disposed on the inner surface of the liquid crystal cell are important for directly heating the liquid crystal layer 7. In addition, it is important to appropriately position the thermo-transmission members 55b and 55f on the outer surface of the liquid crystal lens for preventing the generated heat from radiating to the outside of the liquid crystal lens and to position the thermo-transmission member 55c for relaying the heat between the first liquid crystal lens unit 2 and the second liquid crystal lens unit 3.

Figure 14:
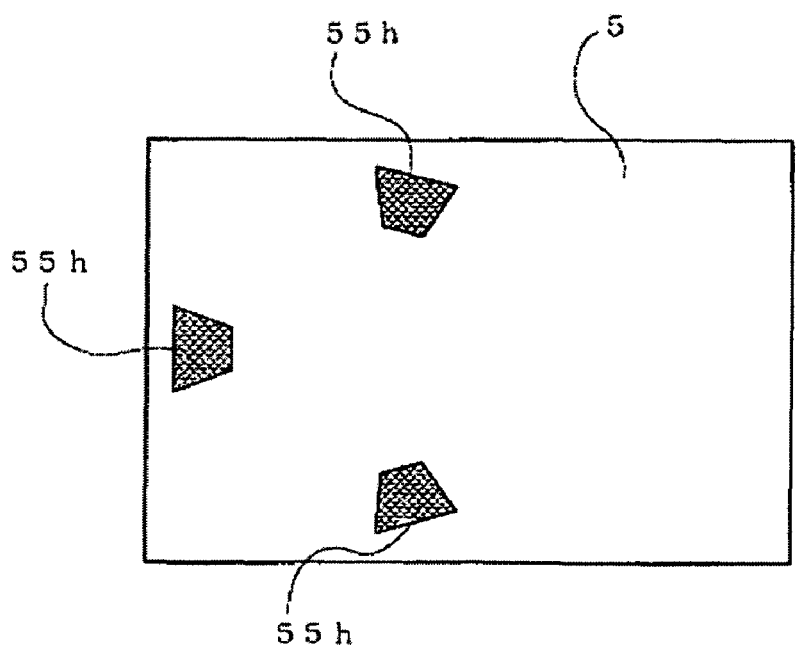
FIG. 14 illustrates a modification of the pattern of the thermo-transmission member according to the second embodiment.
Figure 15:
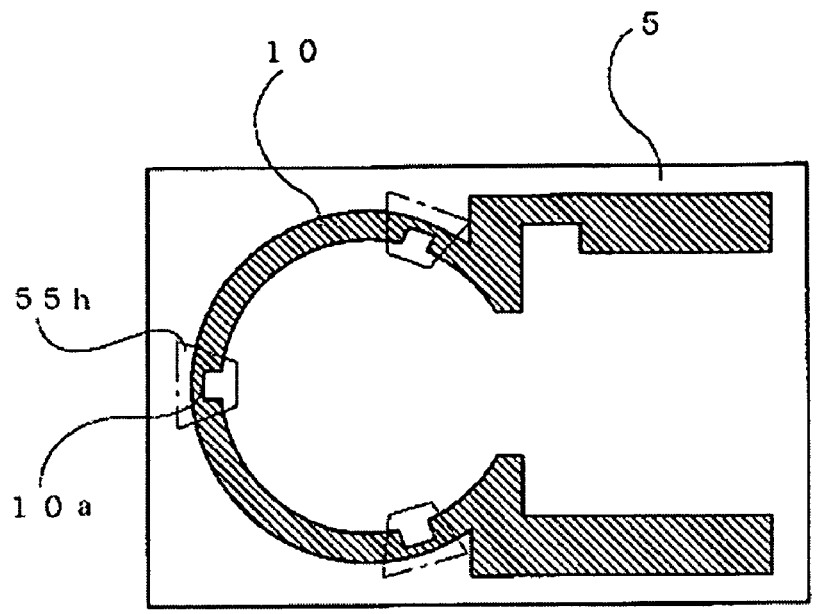
FIG. 15 illustrates patterns for showing the positional relationship between the electric heating element on the inner surface of the first substrate and the thermo-transmission member on the outer surface according to the modification shown in FIG. 14.

FIGS. 14 and 15 show a modification of the pattern of the thermo-transmission member set 55. FIG. 14 illustrates a pattern of the thermo-transmission members 55h provided on a surface remote from the liquid crystal layer 7 of the first transparent substrate 5 in the liquid crystal lens unit 3 illustrated in FIG. 10. FIG. 15 shows the positional relationship between the electric heating element 10 and the thermo-transmission members 55h.

As illustrated in FIG. 14, three independent thermo-transmission members 55h are provided on a surface of the first transparent substrate 5.

As illustrated in FIG. 15, the three independent thermo-transmission members 55h are disposed so as to axially aligned with the high-resistance sections 10a which serve as the heat-generating part of the electric heating element 10. Each of the thermo-transmission members 55h has a slightly larger width than that of the electric heating element 10 other than the high-resistance sections 10a.

The thermo-transmission members 55h correspond to the thermo-transmission member 55c illustrated in FIG. 10. Similarly, the thermo-transmission members 55h can be provided so as to correspond to the thermo-transmission members 55a, 55b, 55d, 55e, and 55f as needed.

A structure in which the independent thermo-transmission members 55h are positioned corresponding to the heat-generating parts of the electric heating element 10 is advantageous in that the temperature rise of the thermo-transmission members caused by heat storage is faster and the generated heat can be effectively used, because radiant heat from the thermo-transmission members to the outside is reduced, compared with the ring-shaped thermo-transmission member.

Since the liquid crystal lens is circular and the electric heating element is ring-shaped, it is optimal that an odd number, 3 or 5, of thermo-transmission members 55h are disposed symmetrically around the center of the ring shape in terms of utilization efficiency of heat and thermal distribution.

Figure 16:
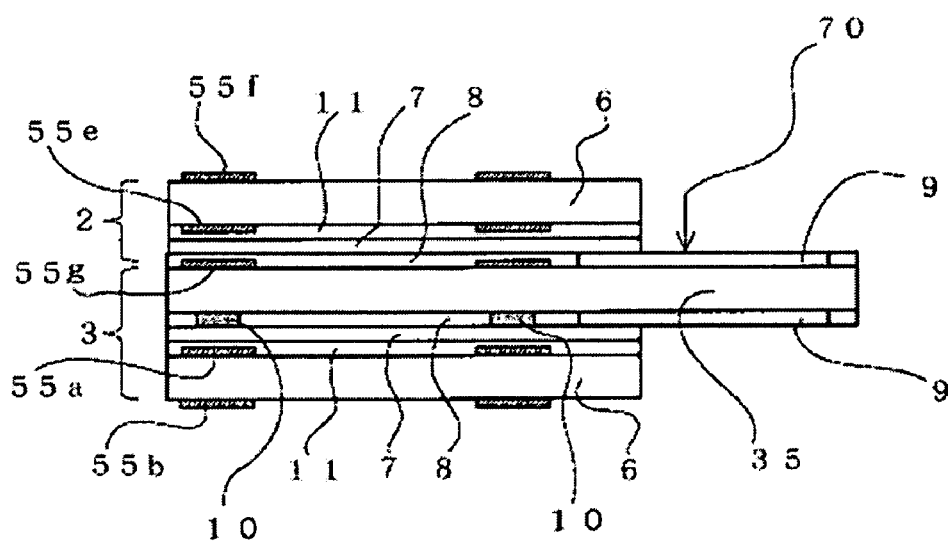
FIG. 16 is a sectional view of a liquid crystal lens according to a first modification of the second embodiment.

FIG. 16 is a sectional view of a liquid crystal lens 70 according to a first modification of the second embodiment. The liquid crystal lens 70 differs from the liquid crystal lens 60 illustrated in FIG. 10 in that a third substrate 35 which is a single common large substrate is provided, in place of the two first transparent substrates 5 which are large substrates of the first liquid crystal lens unit 2 and the second liquid crystal lens unit 3 of the liquid crystal lens 60.

In the liquid crystal lens 70, the concentric liquid-crystal driving electrode set 8 as illustrated in FIG. 16 is disposed on the opposite side surfaces of the third substrate 35, and the electric heating element 10 is provided only on the surface of the same in the second liquid crystal lens unit 3.

The thermo-transmission members in the liquid crystal lens 70 includes a thermo-transmission member 55g disposed on the upper surface of the third substrate 35 so as to be opposite the electric heating element 10, in addition to the thermo-transmission members 55e and 55f disposed on the opposite side surfaces of the second transparent substrate 6, which is common to the liquid crystal lens 60, in the first liquid crystal lens unit 2 and the thermo-transmission members 55a and 55b disposed on both surfaces of the second transparent substrate 6 in the second liquid crystal lens unit 3.

The electric heating element 10 can also be provided in the first liquid crystal lens unit 2. The electric heating element 10 disposed only in the second liquid crystal lens unit 3 can offer sufficient heating characteristics, as described above. Moreover, since the liquid crystal lens 70 includes a single-layer substrate that requires no UV boding layer 12, thermal conductivity can be further increased, and heating characteristics better than those in the liquid crystal lens 20 can be obtained.

Figure 17:
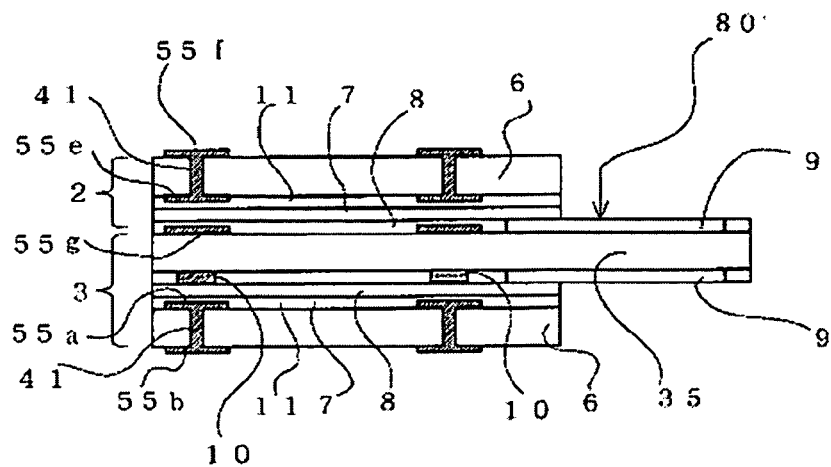
FIG. 17 is a sectional view of a liquid crystal lens according to a second modification of the second embodiment.

FIG. 17 is a sectional view of a liquid crystal lens 80 according to a second modification of the second embodiment. The liquid crystal lens 80 has substantially the same fundamental structure as in the liquid crystal lens 70 illustrated in FIG. 16 but differs from the liquid crystal lens 70 in that the thermo-transmission members 55e and 55f disposed on both surfaces of the second transparent substrate 6 in the first liquid crystal lens unit 2 are connected to each other with a through hole 41 and the thermo-transmission members 55a and 55b disposed on both surfaces of the second transparent substrate 6 in the second liquid crystal lens unit 3 are connected to each other with a through hole 41.

The thermo-transmission members are connected with the metallic through holes 41 which have higher thermal conductivity than that of glass or material of the substrates, thereby increasing the speed of heat transmission between the thermo-transmission members and further increasing responsiveness.

Temperature rise characteristics of the liquid crystal lenses heated by the electric heating element are described below.

Figure 18:
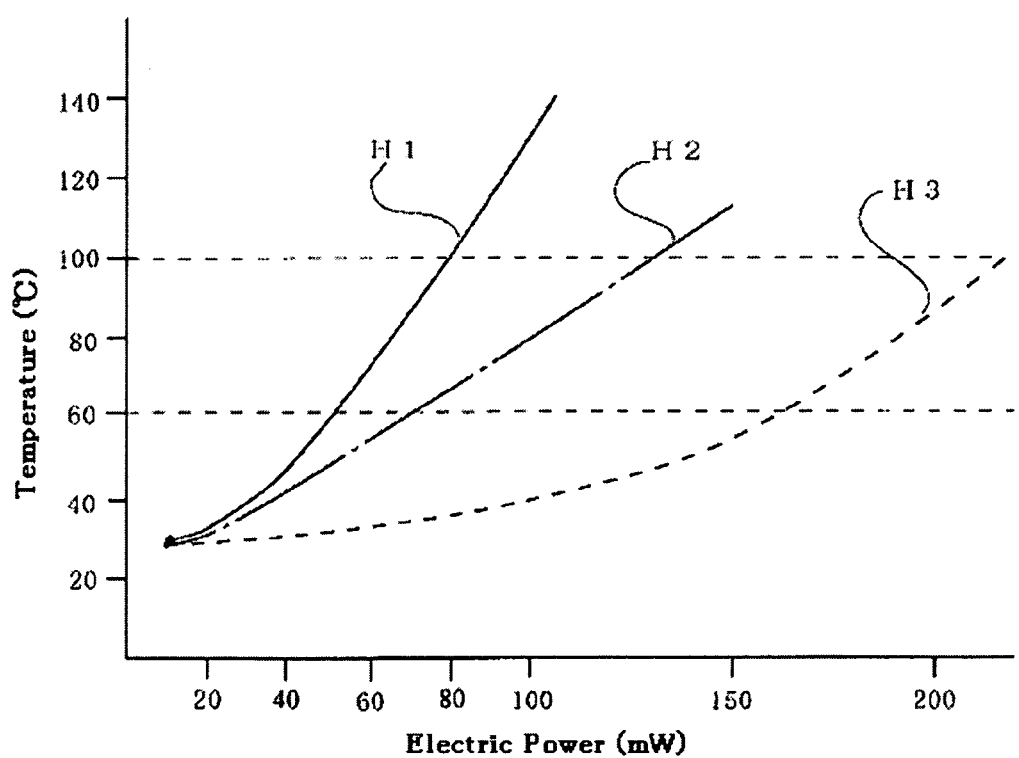
FIG. 18 illustrates temperature rise characteristics of the liquid crystal lens heated with different electric heating element arrangements.
Figure 19:
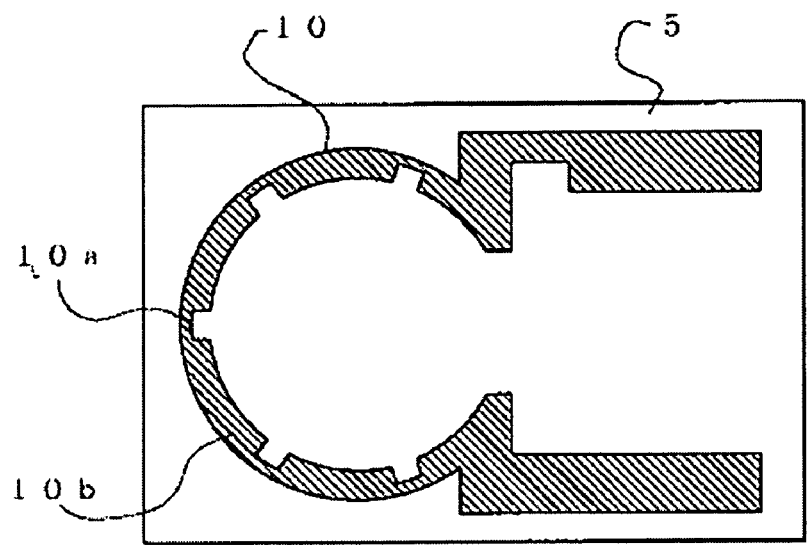
FIG. 19 illustrates a modification of the pattern of the electric heating element according to the first and second embodiments.

FIG. 18 illustrates temperature rise characteristics when the temperature at the center of the liquid crystal layer was measured during heating by the electric heating element. In FIG. 18, H3 denotes a temperature rise characteristic of the liquid crystal lens including a ring-shaped electric heating element having no high-resistance sections 10a illustrated in FIG. 4 and having an uniform width of the low-resistance section 10b, H2 denotes a temperature rise characteristic of the liquid crystal lens including a ring-shaped electric heating element having three high-resistance sections 10a, as illustrated in FIG. 4, and H1 denotes a temperature rise characteristic of the liquid crystal lens including the electric heating element 10 and the thermo-transmission member set 55, as illustrated in FIG. 10.

As illustrated in the temperature rise characteristics, a power required for increasing the temperature of the center of the liquid crystal layer up to 60° C. to 100° C. necessary for proper operation of the liquid crystal lens is 150 to 220 mW for H3, and, 70 to 130 mA for H2. For H1, a power of 50 to 80 mA was needed. This shows that the temperature rise characteristic is markedly improved.

FIGS. 19 to 23 illustrate modifications of the pattern of the electric heating element according to the first and second embodiments. In the pattern of the electric heating element illustrated in FIG. 19, the electric heating element 10 disposed on the first transparent substrate 5 includes an increased number of high-resistance sections 10a, i.e., five high-resistance sections 10a arranged symmetrically about the center of the ring shape of the electric heating element 10.

As described above, heat generated by small sections can be transmitted more efficiently to the entire liquid crystal by increasing the number of heat-generating parts arranged symmetrically about the center of the ring shape of the electric heating element 10.

Figure 20:
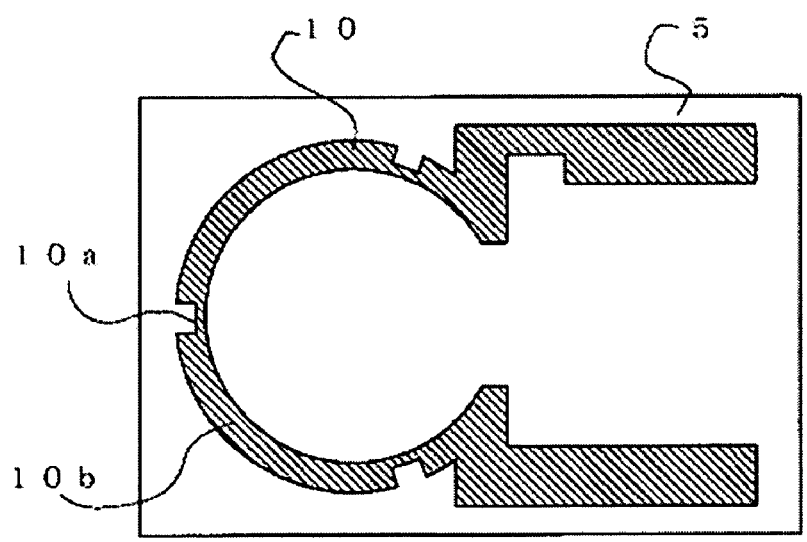
FIG. 20 illustrates another modification of the pattern of the electric heating element according to the first and second embodiments.

In the pattern of the electric heating element illustrated in FIG. 20, the electric heating element 10 disposed on the first transparent substrate 5 includes notches open to the outer area of the ring shape such that the high-resistance sections 10a are formed in the inner area of the ring shape. The high-resistance section 10a is not limited to that having a smaller line width. For example, the high-resistance section can be formed by reducing the thickness thereof.

Figure 21:
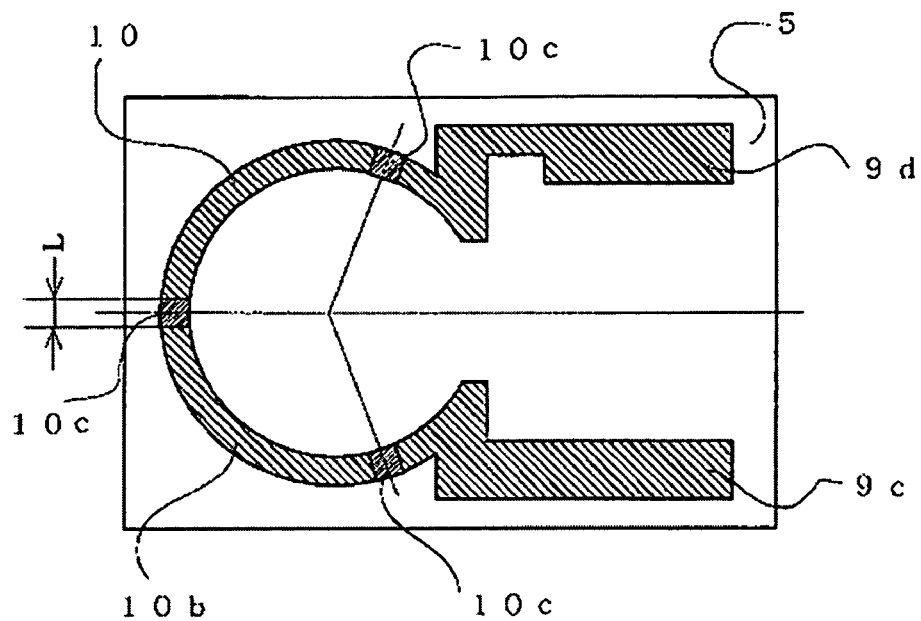
FIG. 21 illustrates still another modification of the pattern of the electric heating element according to the first and second embodiments.

In the pattern of the electric heating element illustrated in FIG. 21, transparent high-resistance sections 10c made of a material different from that of the low-resistance section are disposed as the high-resistance sections. The transparent high-resistance sections 10c and the low-resistance sections 10b are alternately provided so as to exhibit stripes. The liquid crystal lens 1 is heated by causing the transparent high-resistance sections 10c to generate heat upon the application of a voltage supplied from the heater-driving power supply 120. The transparent high-resistance sections can be made of indium tin oxide.

Figure 22:
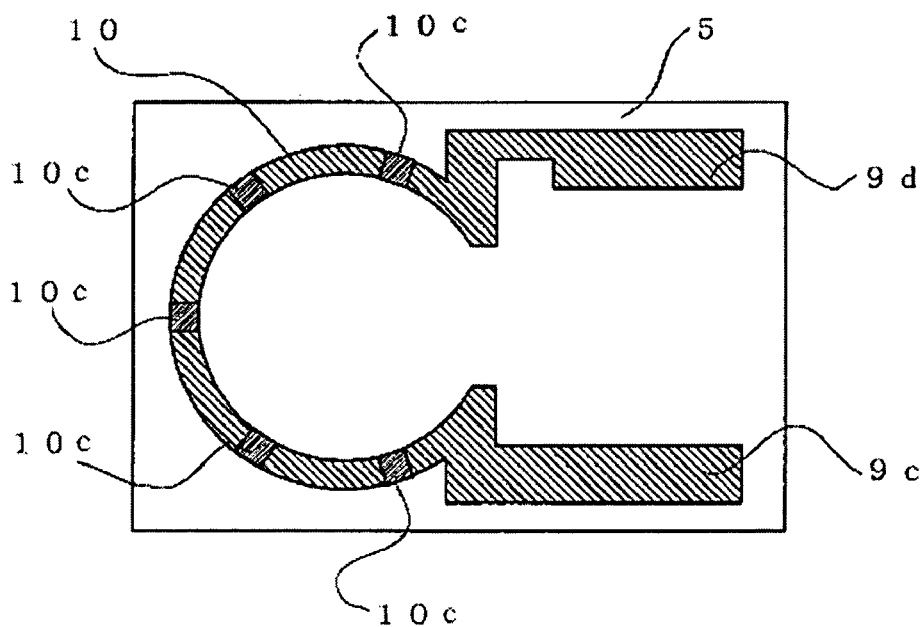
FIG. 22 illustrates yet another modification of the pattern of the electric heating element according to the first and second embodiments.

In the pattern of the electric heating element illustrated in FIG. 22, the electric heating element 10 disposed on the first transparent substrate 5 includes an increased number of transparent high-resistance sections 10c, i.e., five transparent high-resistance sections 10c arranged symmetrically about the center of the ring shape of the electric heating element 10.

As described above, heat generated by small sections can be transmitted more efficiently to the entire liquid crystal by increasing the number of heat-generating parts arranged symmetrically about the center of the ring shape of the electric heating element 10.

Figure 23:
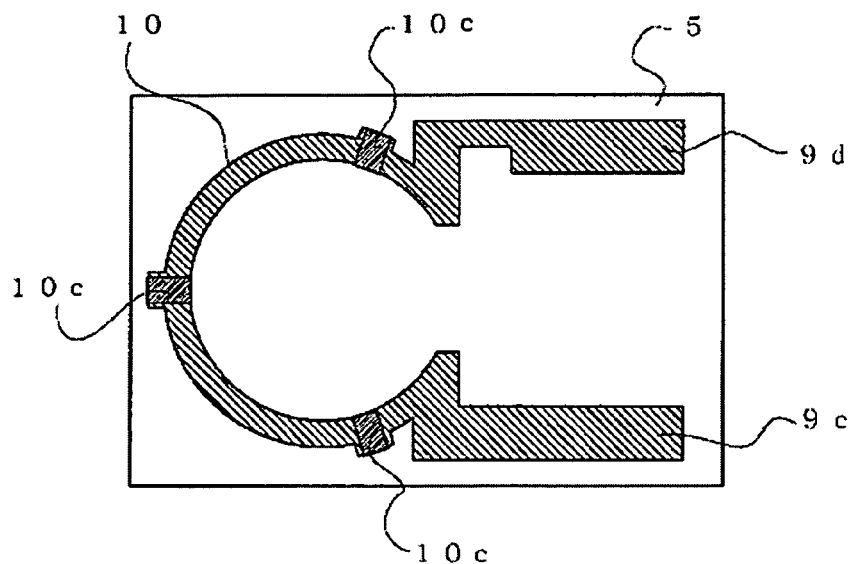
FIG. 23 illustrates still another modification of the pattern of the electric heating element according to the first and second embodiments.
Figure 24:
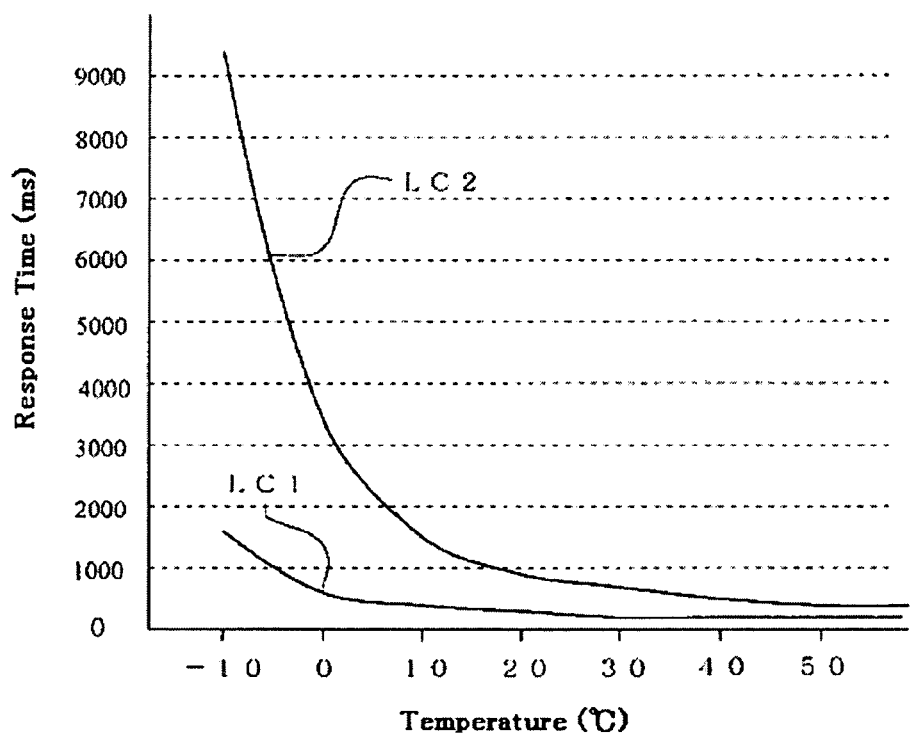
FIG. 24 illustrates the temperature-response speed characteristics of a known liquid crystal cell and a liquid crystal cell used for a lens.

In the pattern of the electric heating element illustrated in FIG. 23, the electric heating element 10 disposed on the first transparent substrate 5 includes the transparent high-resistance sections 10c having a ring width larger than that of the electric heating element 10.

More specifically, a ring width of the electric heating element 10 is 200 μm, whereas each of the transparent high-resistance sections 10c has a ring width of 300 μm and a length L of 20 μm.

This structure increases an area of the transparent high-resistance sections 10c and thus increases temperature rise at the heat-generating part. Therefore, generated heat can be transmitted more efficiently to the entire liquid crystal.

A method for manufacturing a pattern of a liquid crystal lens including the thermo-transmission member set 55 or the electric heating element 10 is described below.

The electric heating element 10 can be made by a method proposed by the inventors of the present invention in Japanese Unexamined Patent Application Publication No. 11-194358. First, an ITO film is formed on an upper surface of the first transparent substrate 5. Then, a paste is prepared by mixing an oxidative resin with gold power dispersed in an organic solvent. The paste is printed on necessary portions on the ITO film (corresponding to the connection terminals 9a to 9e, gold portions of the electric heating element 10, and the thermo-transmission member set 55) by using a screen printing machine to form a gold paste printed film. Next, the first transparent substrate 5 is heated to about 500° C. in a kiln to completely evaporate the resin content in the gold paste printed film. As a result, only gold remains, and a gold film is baked on the surface of the ITO film. The gold film forms the connection terminals 9a to 9e, the gold portions 10a and 10b of the electric heating element 10, and the thermo-transmission member set 55.

Next, a positive photoresist film is formed by screen printing over the whole surface where the gold film and the ITO film are exposed. Then, patterning is performed by ultraviolet-light irradiation using a photomask having a wiring pattern configuration. The first transparent substrate 5 having the patterned photoresist film is then dipped in a gold etching solution to remove undesired portions of the gold film. This etching step removes excess portions of the connection terminals 9a to 9e, the gold portions of the electric heating element 10, and the thermo-transmission member set 55, thereby shaping them to the desired patterns. Subsequently, with desired masking applied thereto, the first transparent substrate 5 is dipped in an ITO etching solution to form the center electrode 8a and the annular electrodes 8b of the concentric liquid-crystal driving electrode set 8 and the ITO portions 10c (as needed) of the electric heating element 10. After this etching step, the first transparent substrate 5 is dipped in a remover to remove the masking film remaining on the surface layer. Thus, the pattern forming step for the first transparent substrate 5 is completed.

The advantages obtained by forming the gold portions of the electric heating element using the method disclosed in Japanese Unexamined Patent Application Publication No. 11-194358 mentioned above are described below.

In the case where the electric heating element is present inside the liquid crystal lens to increase the heating efficiency, in particular, stability of metal is a matter of concern because the metal constituting the electric heating element 10 and the liquid crystal material are in direct contact with each other. In such a case, the gold portions formed by the above-described method are stable. Therefore, there is no deterioration due to a chemical reaction even if the gold portions are in direct contact with the liquid crystal material.

In addition, the gold portions formed by the above-described method have good adhesion to the ITO film and the glass substrate and are therefore unlikely to separate on heating.

The combined process of the above-described method and photoetching process enables formation of fine patterns for an electric heating element 10. Therefore, the combined process facilitates the control of the value of resistance, which is an important factor of the electric heating element 10, and it becomes possible to produce a high-performance liquid crystal lens.

Since, in the present invention, the electric heating element for heating the liquid crystal lens is formed such that high-resistance sections serving as the heat-generating part and the low-resistance sections serving as the connection part are alternately formed, the liquid crystal lens can be heated uniformly. Therefore, the present invention can provide a liquid crystal lens apparatus that is capable of compensating for delay in operation at low temperatures, has a wide focusing range, and enables high-speed response.

Since the liquid crystal lens can be efficiently heated with thermo-transmission members, a liquid crystal lens apparatus that is capable of compensating for delay in operation at low temperatures, has a wide focusing range, and enables high-speed response can be realized.

Since an electric heating element can be present in only a single liquid crystal cell in a liquid crystal lens including two liquid crystal cells, a cost-effective liquid crystal lens with a simplified structure can be realized.

In addition, forming the electric heating element and the thermo-transmission member by using a method disclosed in Japanese Unexamined Patent Application Publication No. 11-194358 mentioned above and etching can offer stability of a pattern printed on the substrate and reduce cost.

In the embodiments, the electric heating element disposed inside a liquid crystal lens is described. However, the present invention is not limited to this structure. The present invention is applicable to an electric heating element disposed outside a liquid crystal lens.

In the above-stated embodiments, the thermo-transmission members are axially aligned with the high resistance parts in the electric heating element 10. However, the present invention is not limited to this arrangement. It is possible for the thermo-transmission member to be formed at a location which is not aligned with the high resistance parts in the electric heating element 10 but receives a large amount of the heat generated by the electric heating element (the location will be determined depending on the structure of the liquid crystal lens).

When there is enough room on a substrate, the thermo-transmission member can also be formed on the substrate on which the electric heating element is provided. In this case, the heating capability can be enhanced.

The liquid crystal lens apparatus is not limited to a camera shown in the embodiments. For example, the liquid crystal lens apparatus is applicable to optical disk pickup devices, medical devices (e.g., endoscopes), and eyeglass diopter adjustment.

Although the present invention has been described in terms of specific embodiments, it is anticipated that alternations and modifications thereof will no doubt become apparent to those skilled in the art. It is therefore intended that the following claims be interpreted as covering all such alternations and modifications as fall within the true spirit and scope of the invention.

What is claimed is:

1. A liquid crystal lens apparatus comprising a first liquid crystal lens unit comprising:
    a first substrate having a first and a second opposing surfaces and including a first transparent region;
    a second substrate having a first and a second opposing surfaces and including a second transparent region aligned in parallel with the first transparent region of the first substrate, the first surface of the first substrate being opposite to the first surface of the second substrate;
    a first liquid crystal layer comprising liquid crystal filled between the first surfaces of the first and second transparent regions; and
    first and second electrodes arranged on the first and second substrates, respectively, to apply a voltage across the first liquid crystal layer;
    an electric heating element arranged to heat the first liquid crystal layer; and
    at least one thermo-transmission member ineffective in self-heating but made of a material storable of thermal energy from outside and radiant of the stored thermal energy, the at least one thermo-transmission member being so shaped and positioned as to receive heat energy from the electric heating element and radiate the stored heat energy to facilitate heating of the liquid crystal layer by the electric heating element.

2. The liquid crystal lens apparatus according to claim 1, wherein the electric heating element is disposed on the first surface of the first substrate, and one of the at least one thermo-transmission member is disposed on the first surface of the second substrate.

3. The liquid crystal lens apparatus according to claim 1, wherein the electric heating element is disposed on the first surface of the first substrate, and one of the at least one thermo-transmission member is disposed on the second surface of the second substrate.

4. The liquid crystal lens apparatus according to claim 2, wherein another of the at least one thermo-transmission member is disposed on the second surface of the second substrate, the liquid crystal lens apparatus further comprising a heat conductive member extending through the second substrate to thermally connect the thermo-transmission members disposed on the first and second surfaces of the second substrate.

5. The liquid crystal lens apparatus according to claim 1, wherein the electric heating element is disposed on one of the first and second surfaces of the first substrate, and one of the at least one thermo-transmission member is disposed on the other of the first and second surfaces of the first substrate.

6. The liquid crystal lens apparatus according to claim 1, wherein the electric heating element is disposed on one of the first and second surfaces of the first substrate, and one of the at least one thermo-transmission member is disposed on one of the first and second surfaces of the second substrate in opposing relationship with the electric heating element.

7. The liquid crystal lens apparatus according to claim 5 or claim 6, wherein the electric heating element is in the shape of a ring surrounding the first electrode, and the thermo-transmission member is in the shape coincident with the electric heating element.

8. The liquid crystal lens apparatus according to claim 1, wherein the electric heating element and the thermo-transmission member are films made of a metal.

9. The liquid crystal lens apparatus according to claim 8, wherein the metal films are made of gold.

10. The liquid crystal lens apparatus according to claim 1, wherein the electric heating element is in the shape of a strip and includes at least one high-electrical-resistance section and at least one low-electrical-resistance section that are alternately arranged in the electric heating element.

11. The liquid crystal lens apparatus according to claim 10, wherein the at least one high-electrical-resistance section has a width smaller than that of the at least one low-electrical-resistance section.

12. The liquid crystal lens apparatus according to claim 10, wherein the at least one high-electrical-resistance section has a thickness smaller than that of the at least one low-electrical-resistance section.

13. The liquid crystal lens apparatus according to claim 10, wherein the at least one high-electrical-resistance section is formed of a transparent material.

14. The liquid crystal lens apparatus according to claim 13, wherein the transparent material is indium tin oxide.

15. The liquid crystal lens apparatus according to claim 13, wherein the line width of the high-electrical-resistance section is larger than the line width of the low-electrical-resistance section.

16. The liquid crystal lens apparatus according to claim 1, further comprising a second liquid crystal lens unit including:
a third substrate having a third transparent region;
a fourth substrate having a fourth transparent region and aligned in parallel with the third substrate, the fourth transparent region facing the third transparent region;
a second liquid crystal layer comprising liquid crystal filled between the third and fourth transparent regions; and
third and fourth electrodes disposed on the third and fourth substrates, respectively, for applying a voltage across the second liquid crystal layer,
wherein the liquid crystal of the first liquid crystal layer and the liquid crystal of the second liquid crystal layer are oriented perpendicular to each other.

17. The liquid crystal lens apparatus according to claim 1, further comprising a second liquid crystal lens unit including:
a third substrate having a third transparent region and aligned in parallel with the first substrate such that the third transparent region faces the first transparent region;
a second liquid crystal layer comprising liquid crystal filled between the first and third transparent regions; and
third and fourth electrodes disposed on the first and third substrates, respectively, for applying a voltage across the second liquid crystal layer,
wherein the liquid crystal of the first liquid crystal layer and the liquid crystal of the second liquid crystal layer are oriented perpendicular to each other.

18. The liquid crystal lens apparatus according to claim 16 or claim 17, wherein the electric heating element is disposed in the second liquid crystal lens unit.

19. A liquid crystal lens apparatus comprising a first liquid crystal lens, the first crystal lens comprising:
a first substrate having a first transparent region;
a second substrate having a second transparent region and aligned in parallel with the first substrate, the second transparent region facing the first transparent region;
a first liquid crystal layer comprising liquid crystal filled between the first and second transparent regions;
first and second electrodes disposed on the first and second substrates, respectively, for applying a voltage across the first liquid crystal layer; and,
a strip-shaped electric heating element including at least one high-electrical-resistance section and at least one low-electrical-resistance section that are alternately arranged in the electric heating element, the at least one high-electrical-resistance section and the at least one low-electrical-resistance section being made of the same metal material.

20. The liquid crystal lens apparatus according to claim 19, wherein the at least one high-electrical-resistance section has a width smaller than that of the low-electrical-resistance section.

21. The liquid crystal lens apparatus according to claim 19, wherein the at least one high-electrical-resistance section has a thickness smaller than that of the low-electrical-resistance section.

22. The liquid crystal lens apparatus according to claim 19, wherein the same metal material is gold.

23. The liquid crystal lens apparatus according to claim 19, wherein the electric heating element is in the shape of a ring surrounding the first electrode, and the at least one high-electrical-resistance section is defined with a notch formed in the electric heating element.

24. The liquid crystal lens apparatus according to claim 19, further comprising a second liquid crystal lens unit comprising:
a third substrate having a third transparent region;
a fourth substrate having a fourth transparent region and aligned in parallel with the third substrate, the fourth transparent region facing the third transparent region;
a second liquid crystal layer comprising liquid crystal filled between the third and fourth transparent regions; and
third and fourth electrodes disposed on the third and fourth substrates, respectively, to apply a voltage across the second liquid crystal layer,
wherein the liquid crystal of the first liquid crystal layer and the liquid crystal of the second liquid crystal layer are oriented perpendicular to each other.

25. The liquid crystal lens apparatus according to claim 19, further comprising a second liquid crystal lens unit comprising:
a third substrate having a third transparent region and aligned in parallel with the first substrate, the third transparent region facing the first transparent region;
a second liquid crystal layer comprising liquid crystal filled between the first and third transparent regions; and
third and fourth electrodes disposed on the first and third substrates, respectively, to apply a voltage across the second liquid crystal layer,
wherein the liquid crystal of the first liquid crystal layer and the liquid crystal of the second liquid crystal layer are oriented perpendicular to each other.

26. The liquid crystal lens apparatus according to claim 24 or claim 25, wherein the electric heating element is disposed in the second liquid crystal lens unit.

* * * * *